(12) United States Patent
Lippert et al.

(10) Patent No.: US 7,484,494 B2
(45) Date of Patent: Feb. 3, 2009

(54) METHOD AND APPARATUS FOR A SPARK-IGNITED DIRECT INJECTION ENGINE

(75) Inventors: Andreas M. Lippert, Rochester Hills, MI (US); Michael C. Drake, Rochester Hills, MI (US); Yangbing Zeng, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 164 days.

(21) Appl. No.: 11/626,856

(22) Filed: Jan. 25, 2007

(65) Prior Publication Data
US 2007/0175440 A1 Aug. 2, 2007

Related U.S. Application Data

(60) Provisional application No. 60/762,838, filed on Jan. 27, 2006.

(51) Int. Cl.
*F02B 17/00* (2006.01)
*F02B 5/00* (2006.01)

(52) U.S. Cl. ...................... 123/295; 123/305
(58) Field of Classification Search ................. 123/294, 123/295, 298, 305
See application file for complete search history.

(56) References Cited

U.S. PATENT DOCUMENTS

| | | | |
|---|---|---|---|
| 2,381,623 A | 8/1945 | Silber | |
| 3,154,059 A | 10/1964 | Witzky et al. | |
| 3,774,871 A | 11/1973 | Semmes | |
| 4,416,229 A | 11/1983 | Wood | |
| 4,543,930 A | 10/1985 | Baker | |
| 4,546,740 A | 10/1985 | Clements | |
| 4,644,745 A | 2/1987 | Wagner | |
| 4,662,174 A | 5/1987 | Toulmay | |
| 4,693,227 A | 9/1987 | Satou | |
| 4,742,801 A | 5/1988 | Kelgard | |
| 4,801,092 A | 1/1989 | Webber | |
| 4,883,032 A | 11/1989 | Hunter | |
| 4,893,470 A | 1/1990 | Chang | |
| 4,893,754 A | 1/1990 | Ruiz | |
| 5,042,442 A | 8/1991 | Laskaris et al. | |
| 5,076,244 A | 12/1991 | Donaldson | |
| 5,092,039 A | 3/1992 | Gaskell | |
| 5,220,787 A | 6/1993 | Bulman | |
| 5,224,344 A | 7/1993 | Keirsey | |
| 5,271,365 A | 12/1993 | Oppenheim | |
| 5,285,755 A | 2/1994 | Regueiro | |
| 5,315,973 A | 5/1994 | Hill | |
| 5,327,864 A | 7/1994 | Regueiro | |
| 5,353,992 A | 10/1994 | Regueiro | |
| 5,392,745 A | 2/1995 | Beck | |
| 5,463,997 A | 11/1995 | Cutler | |
| 5,467,754 A | 11/1995 | Beck et al. | |
| 5,551,638 A | 9/1996 | Caley | |
| 5,709,190 A | 1/1998 | Suzuki | |

(Continued)

OTHER PUBLICATIONS

Tetsuya Honda, A Study of Mixture Formation and Combustion for Spray Guided DISI, SAE Technical Paper Series, 2004-01-0046, Mar. 8, 2004, SAE International, Detroit.

*Primary Examiner*—John T Kwon (57) ABSTRACT

A spark-ignition, direct injection internal combustion engine includes a fuel injector effective to produce a fuel spray pattern which is relatively compact at low loads and relatively large at high loads.

11 Claims, 7 Drawing Sheets

U.S. PATENT DOCUMENTS

| | | |
|---|---|---|
| 5,730,100 A | 3/1998 | Bergsten |
| 5,833,142 A | 11/1998 | Caley |
| 5,868,112 A | 2/1999 | Mahakul |
| 5,970,946 A | 10/1999 | Shea et al. |
| 5,983,853 A | 11/1999 | Roessler et al. |
| 6,003,488 A | 12/1999 | Roth |
| 6,152,122 A | 11/2000 | Hampson |
| 6,474,321 B1 | 11/2002 | Suckewer |
| 6,481,420 B1 | 11/2002 | Panasuk |
| 6,553,981 B1 | 4/2003 | Suckewer |
| 6,609,494 B2 | 8/2003 | Holtman |
| 6,659,365 B2 | 12/2003 | Gipson |
| 6,662,793 B1 | 12/2003 | Allen |
| 6,705,273 B1 | 3/2004 | Liu |
| 6,705,274 B2 * | 3/2004 | Kubo .................. 123/295 |
| 6,725,828 B1 * | 4/2004 | Han et al. ............ 123/295 |
| 6,732,702 B2 | 5/2004 | Liu |
| 6,742,493 B2 | 6/2004 | Ziegler et al. |
| 6,752,131 B2 | 6/2004 | Poola |
| 6,799,733 B1 | 10/2004 | Pace et al. |
| 6,868,817 B2 | 3/2005 | Liu |
| 6,923,387 B2 | 8/2005 | Carlisle |
| 6,935,301 B2 | 8/2005 | Liu |
| 6,945,210 B2 | 9/2005 | Liu |
| 6,955,165 B2 | 10/2005 | Liu |
| 6,955,307 B2 | 10/2005 | Carlisle |
| 6,966,294 B2 | 11/2005 | Eckerle |
| 6,974,111 B2 | 12/2005 | Janeke |
| 6,978,760 B2 * | 12/2005 | Stewart et al. ............ 123/299 |
| 6,997,158 B1 | 2/2006 | Liu |
| 6,997,401 B2 | 2/2006 | Baasch |
| 2002/0170280 A1 | 11/2002 | Soh |
| 2003/0047624 A1 | 3/2003 | Kilgore |
| 2003/0085305 A1 | 5/2003 | Clarke |
| 2003/0102389 A1 | 6/2003 | Clarke |
| 2003/0102390 A1 | 6/2003 | Clarke |
| 2003/0155439 A1 * | 8/2003 | Winner .................. 239/533.2 |
| 2003/0160114 A1 | 8/2003 | Caley |
| 2003/0168038 A1 | 9/2003 | Leonard McKay |
| 2004/0020457 A1 | 2/2004 | Regueiro |
| 2004/0021013 A1 | 2/2004 | Lawrence |
| 2004/0123832 A1 | 7/2004 | Quigley |
| 2004/0173695 A1 | 9/2004 | Patrick |
| 2004/0237929 A1 | 12/2004 | Cavanagh |
| 2005/0166890 A1 | 8/2005 | Wickman et al. |
| 2005/0224606 A1 | 10/2005 | Dingle |
| 2005/0241612 A1 | 11/2005 | Ward |
| 2006/0102140 A1 * | 5/2006 | Sukegawa et al. ............ 123/297 |

* cited by examiner

METHOD AND APPARATUS FOR A SPARK-IGNITED DIRECT INJECTION ENGINE

CROSS REFERENCE TO RELATED APPLICATIONS

This application claims priority to U.S. provisional patent application Ser. No. 60/762,838 filed on Jan. 27, 2006 which is hereby incorporated herein by reference.

TECHNICAL FIELD

This invention is related to spark-ignited, direct injection (SIDI) internal combustion engines. More particularly, the invention is concerned with effective fuel injection in a SIDI engine across widely varying engine loads.

BACKGROUND OF THE INVENTION

Fuel injectors are well-known devices for injecting fuel into engines, either into an intake manifold upstream of a combustion chamber, or directly into the combustion chamber. It is highly desirable that the fuel spray be well atomized for rapid vaporization, and mix appropriately with air, in order to achieve optimal combustion and power generation while minimizing formation of undesirable byproducts of combustion, and preventing uncontrolled combustion events.

Engineers are developing spark ignition engines with direct fuel injection (SIDI) which operate using a stratified combustion charge strategy and a homogeneous combustion charge strategy, depending upon operator demand for power and engine operating conditions. The SIDI engines are being developed to improve engine fuel efficiency and thus improve vehicle fuel economy. Generally, an SIDI engine is preferably operated at high load conditions with a homogenous charge. And, an SIDI engine is preferably operated at low load conditions with a stratified charge. Homogeneous charge is most readily achieved with a wide fuel injection spray cone angle whereas stratified charge is most readily achieved with a narrow fuel injection spray cone angle. Engineers make tradeoffs in designing fuel injectors to address the divergent low load and high load fueling requirements when selecting spray cone angles.

SUMMARY OF THE INVENTION

An SIDI engine includes a variable volume combustion chamber including a cylinder and reciprocating piston, a spark plug having a spark gap and a direct in-cylinder fuel injector. A method for operating the engine includes providing a fuel injector tip having a plurality of through-holes arranged in a through-hole pattern to produce a fuel spray pattern having a relatively compact fuel cone angle at the low-load limit of the engine and a relatively wide fuel cone angle at the high-load limit of the engine and cooperatively locating the fuel injector and spark gap such that a portion of the fuel spray pattern from the injector will intersect the spark gap at the low-load limit of the engine. Each of the through-holes is effective to direct a fuel plume along a respective through-hole axis that is neither parallel to nor coplanar with the injector centerline, thereby providing twisted-plumes of fuel. The through-hole pattern produces a fuel spray pattern of generally increasing fuel cone angle between the low load and the high load limits of the engine. The through-hole pattern may produce a fuel spray swirl generally opposing the swirl of bulk intake air.

A SIDI engine apparatus includes a variable volume combustion chamber including a cylinder, a cylinder head including an intake and an exhaust valve, and a reciprocating piston. The apparatus includes a spark plug having a spark gap for producing an ignition spark within the combustion chamber and a fuel injector for injecting fuel within the combustion chamber. The fuel injector includes a fuel injector tip having a plurality of through-holes arranged in a through-hole pattern to produce a fuel spray pattern with a fuel cone angle that generally increases with increasing fuel mass injection. And, the fuel injector and spark plug are cooperatively located such that the fuel spray pattern intersects the spark gap. Each of the through-holes directs a fuel plume along a respective through-hole axis that is neither parallel to nor coplanar with the injector centerline. Each of the through-holes may direct a fuel plume to swirl in general opposition to a bulk intake air swirl. And, the reciprocating piston may include a recessed bowl.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DESCRIPTION OF THE PREFERRED EMBODIMENT

Figure 1A:
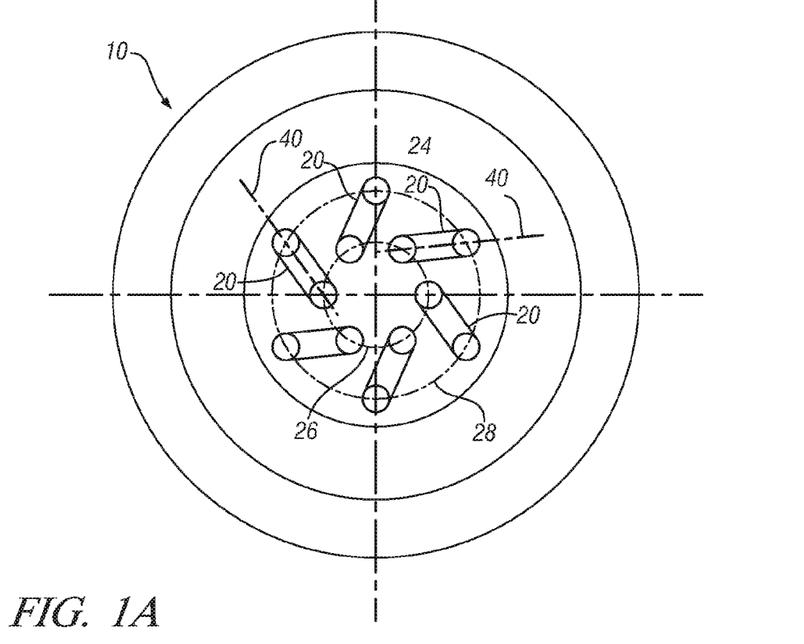
FIGS. 1A and 1B are three-dimensional schematic diagrams exemplifying injector tip though-holes in accordance with the present invention.
Figure 1B:
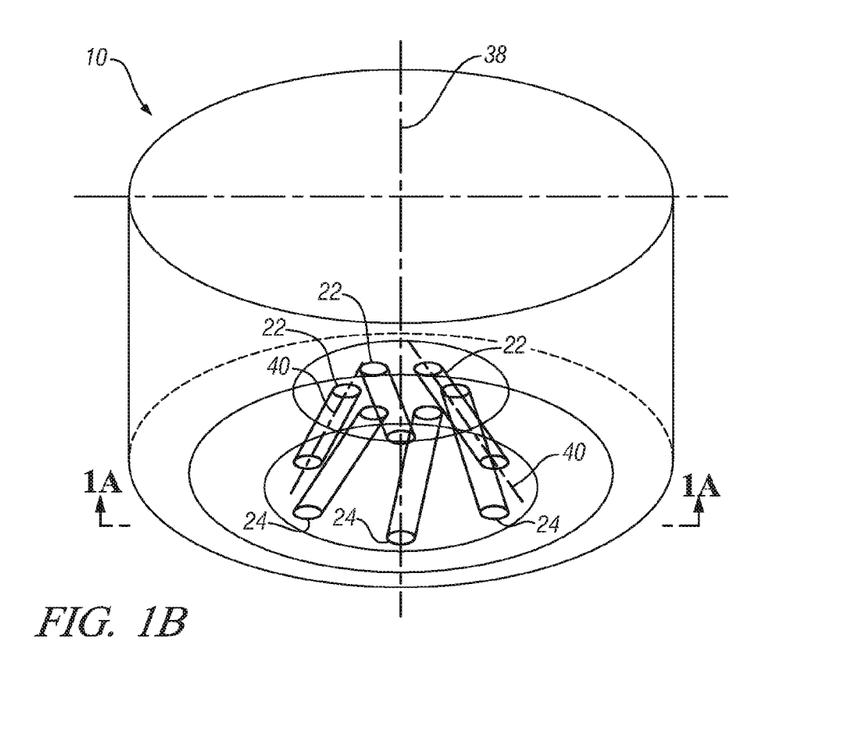
Figure 2A:
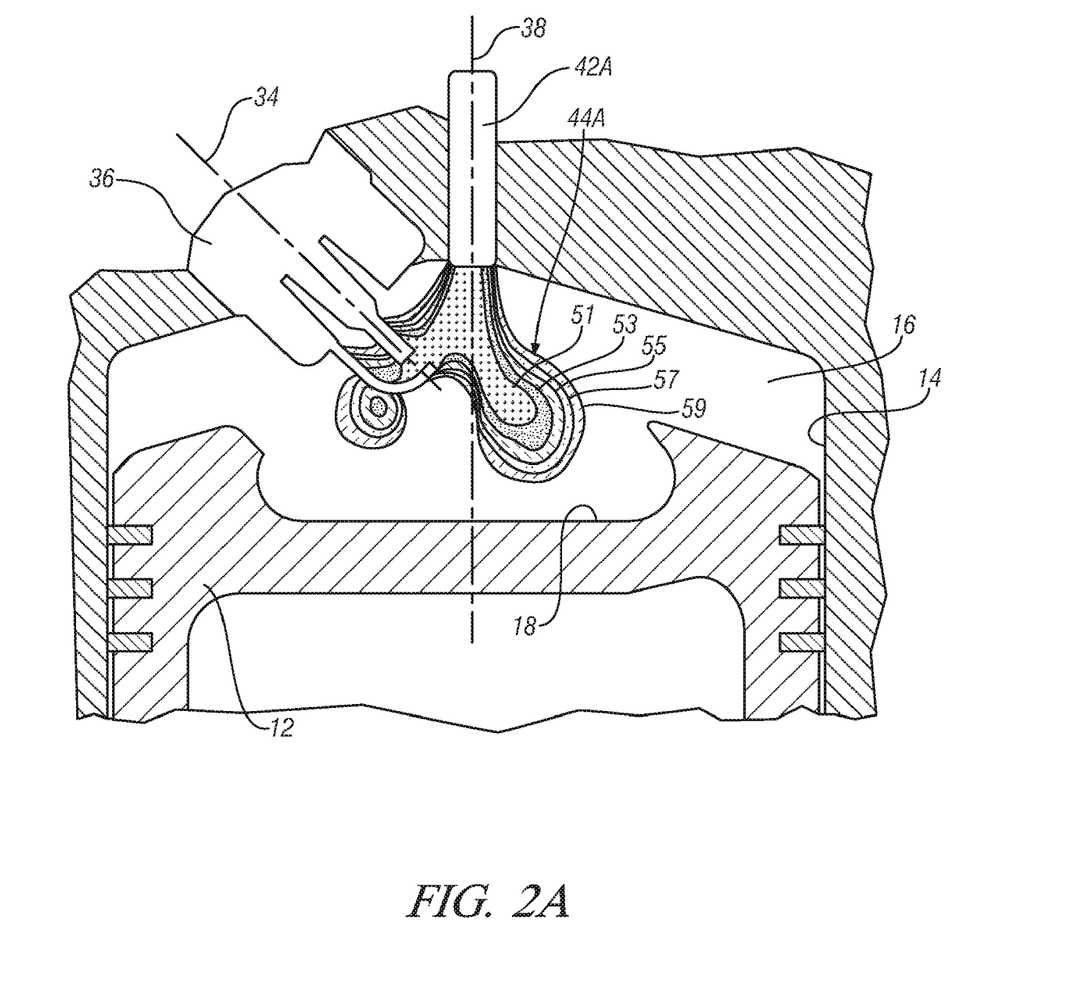
FIGS. 2A and 2B are partial sectional views through an exemplary SIDI combustion chamber illustrating and comparing flow from a known fuel injector and from a twisted-plumes fuel injector in accordance with the present invention.
Figure 2B:
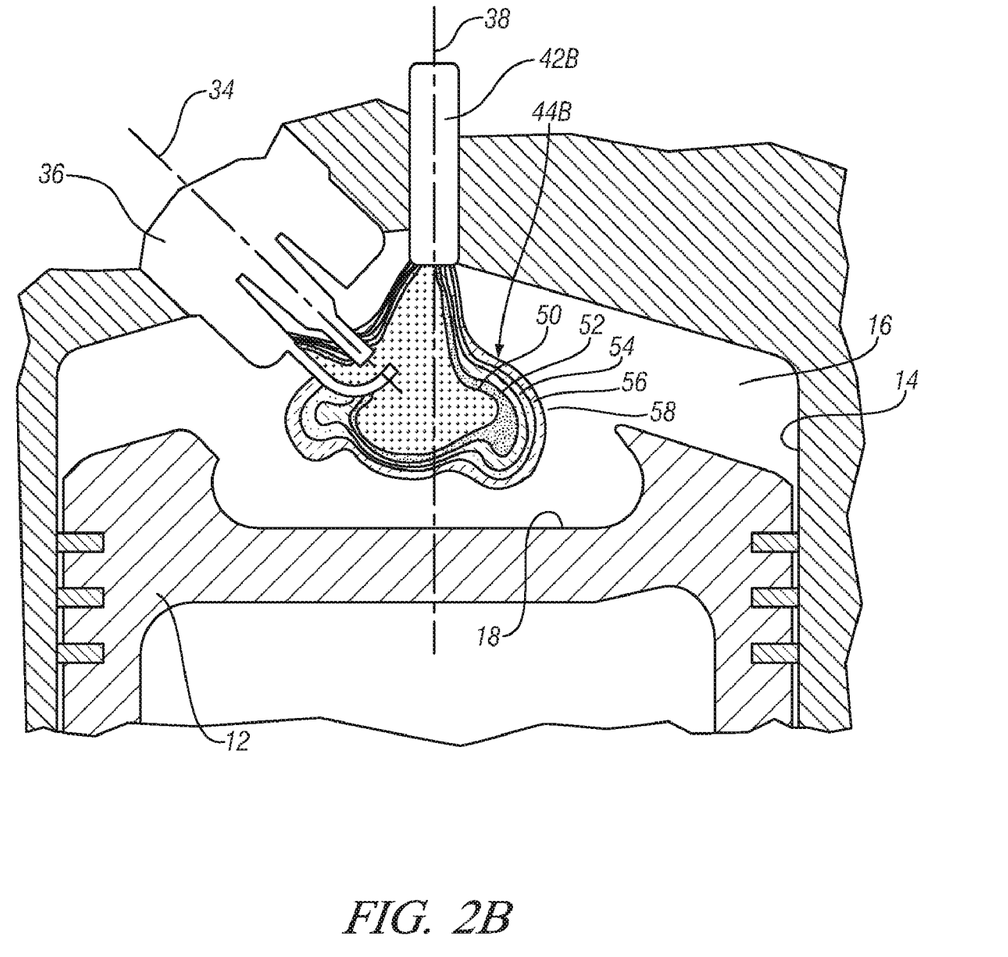

Referring now to the drawings, wherein the showings are for the purpose of illustrating the invention only and not for the purpose of limiting the same, FIGS. 1A and 1B schematically illustrate an exemplary through-hole pattern 10 of a fuel injector tip in accordance with an embodiment of the present invention. A fuel injector tip in accordance with the present invention may comprise a substantially planar director plate, a spherical or conical injector tip, or any various tip design compatible with the exemplary through-hole pattern described more fully in detail herein below. Through-holes 20 in accordance with the invention are arranged such that fuel plumes are introduced into the combustion chamber in a twisted pattern as will become more apparent from the description herein below. A fuel injector tip including through-hole pattern 10 is intended for application on a solenoid-controlled fuel injector in a spark-ignition, direct injection (SIDI) four-cycle internal combustion engine. For example, a combustion chamber of an exemplary SIDI engine is partially illustrated in cross-section in FIGS. 2A and 2B wherein a piston 12 is movable in a closed end cylinder 14 and defines with the cylinder 14 a variable volume combustion chamber 16. The piston 12 includes a recessed bowl 18 into which fuel is primarily injected. The combustion chamber is configured with a spark plug 36 and a fuel injector 42 cooperatively arranged such that the fuel spray pattern from the injector 42 will intersect the spark plug gap. In the exemplary SIDI engine and combustion chamber illustrated in FIGS. 2A and 2B, the fuel injector 42 has its spray tip located substantially central in the cylinder head with respect to the cylinder axis to generate a spray pattern centered about the injector centerline 38. The spark plug 36 located offset in the cylinder head with respect to the cylinder axis with its spark gap located within the combustion chamber along the spark plug centerline 34. The injector and spark plug centerlines 38, 34 are inclined with respect to each other in accordance with such considerations as packaging, injector spray pattern, spark gap protrusion, distance between spark gap and injector spray tip, etc.

FIGS. 1A and 1B illustrate three-dimensional phantom views of the through-holes 20 in injector tip of fuel injector 42B detailing in an exemplary through-hole pattern 10 through which pressurized fuel passes into the combustion chamber when the injector 42B is actuated by a signal from an engine controller. Inlet openings 22 to the through-holes 20 are preferably oriented on a first circumference 26 concentric with, and on a plane orthogonal to, the injector centerline 38. Outlet openings 24 from the through-holes 20 are oriented on a second circumference 28 concentric to the first circumference 26 and the injector centerline 38 and also on a plane orthogonal to the injector centerline 38. Preferably, second circumference 28 is larger than the first circumference 26 though alternatively they may be equivalent or the second circumference 28 may be smaller than the first circumference 26 in accordance with the desired spray pattern including equivalence ratio distributions. Each through-hole 20 is substantially cylindrical with a respective through-hole axis 40 therethrough. The through-hole axes 40 of the through-holes 20 are neither parallel to nor coplanar with the injector centerline 38, thereby establishing individual fuel plumes that exhibit a tangential injection component. Pressurized fuel passing through the injector tip having a through-hole pattern 10 as described results in twisted-plumes with respect to the injector centerline 38. For comparison, a conventional injector may have through-hole axes that are coplanar with the injector centerline 38 and include only a radial injection component. A fuel injector comprising the through-hole pattern 10 as described herein above, may further be referred to herein below as a twisted-plumes injector.

Figure 3:
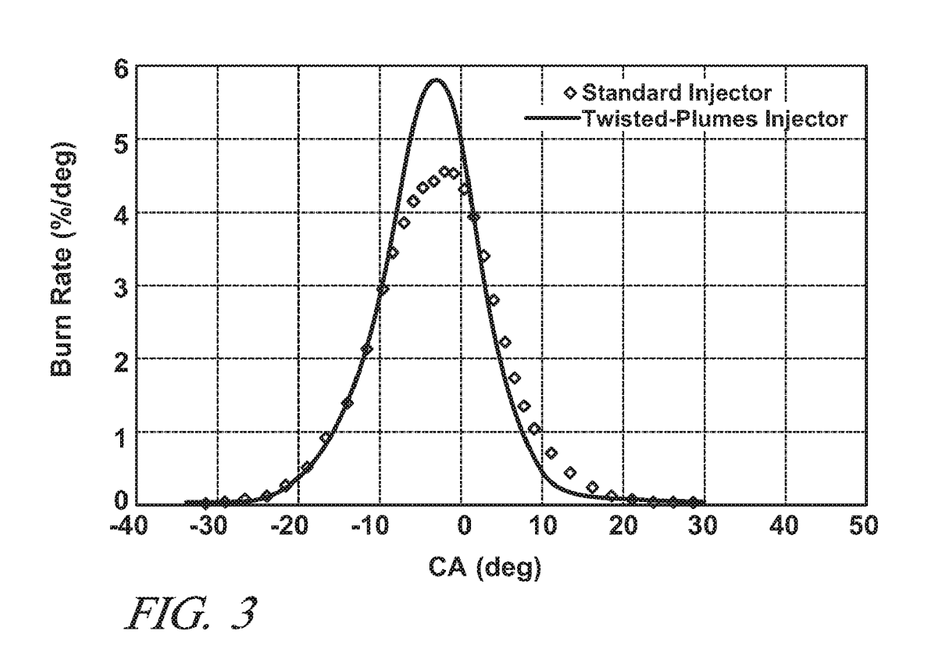
FIG. 3 is a graphical representation of the burn rate versus crank angle in an exemplary SIDI engine illustrating and comparing known fuel injectors and a twisted-plumes fuel injector in accordance with the present invention.

Computational fluid dynamics (CFD) predicted fuel burn rate curves are shown in FIG. 3 for fuel directly injected into an exemplary SIDI engine using a twisted-plumes injector as describe herein above. One skilled in the art will appreciate from FIG. 3 that the twisted-plumes injector produces a faster initial and peak burn rate, as compared to a conventional fuel injector. And, with reference again to FIGS. 2A and 2B, and more particularly with respect to respective equivalence ratio contours 44A and 44B for conventional and twisted-plumes injectors, respectively, at a mid-load stratified operating point of about 280 NMEP at 2000 RPM, one skilled in the art will recognize that more fuel is concentrated along the injector axis of the twisted-plumes injector. Thus more fuel is close to the spark plug, which speeds up the initial and middle stage of the combustion process as illustrated in FIG. 3.

Figure 4A:
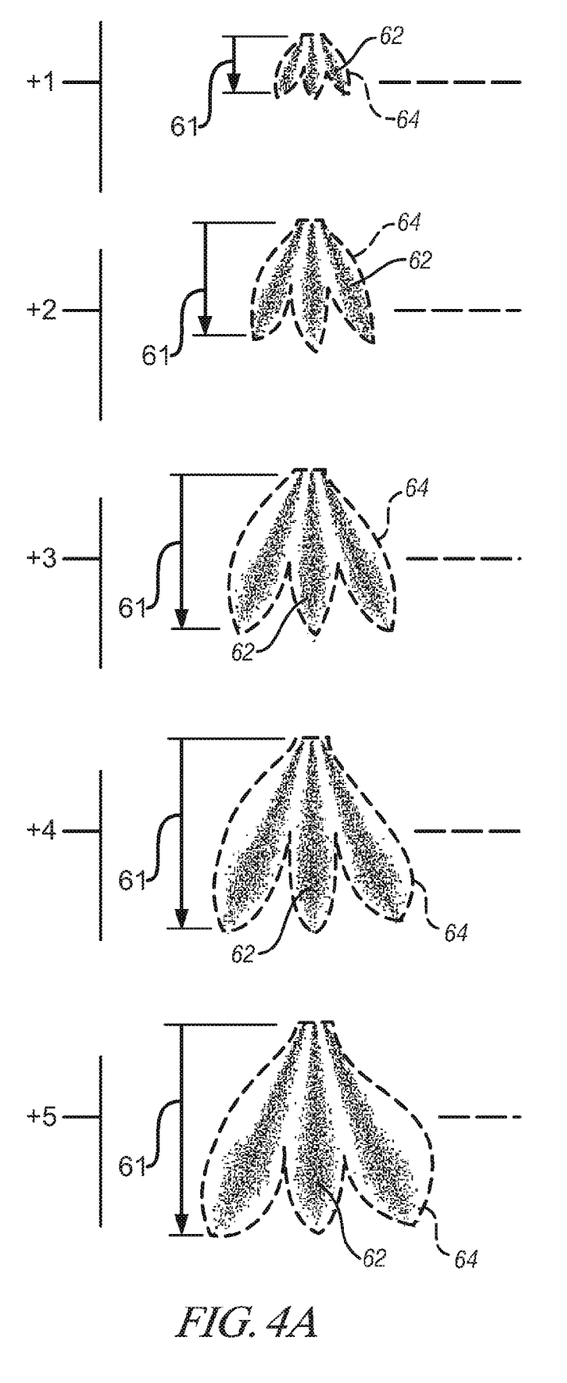
FIGS. 4A and 4B are spatial representations illustrating and comparing flow spray patterns including effective cone angle and penetration from a known fuel injector and from a twisted-plumes fuel injector, respectively, in accordance with the present invention.
Figure 4B:
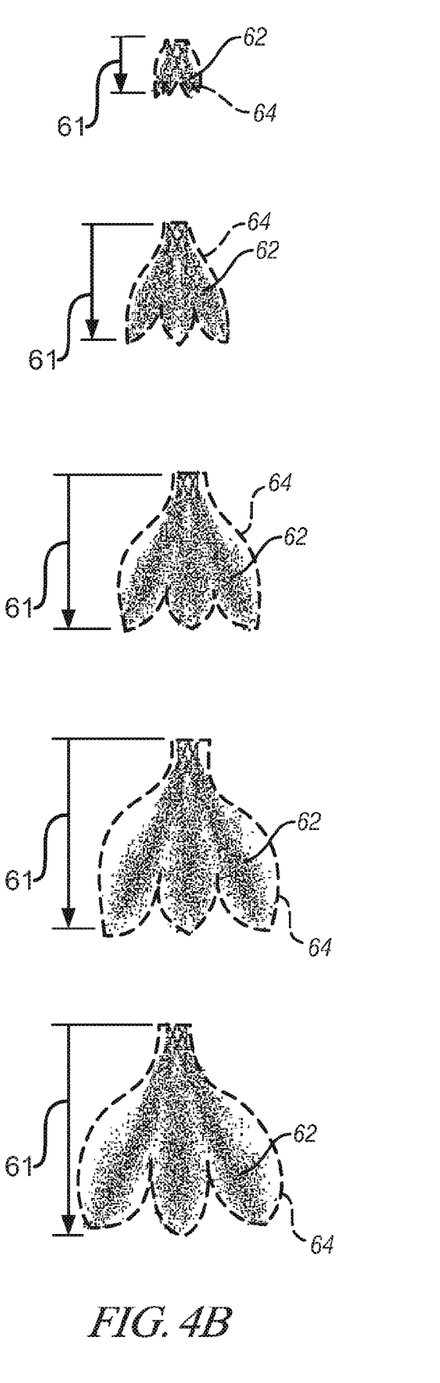
Figure 5:
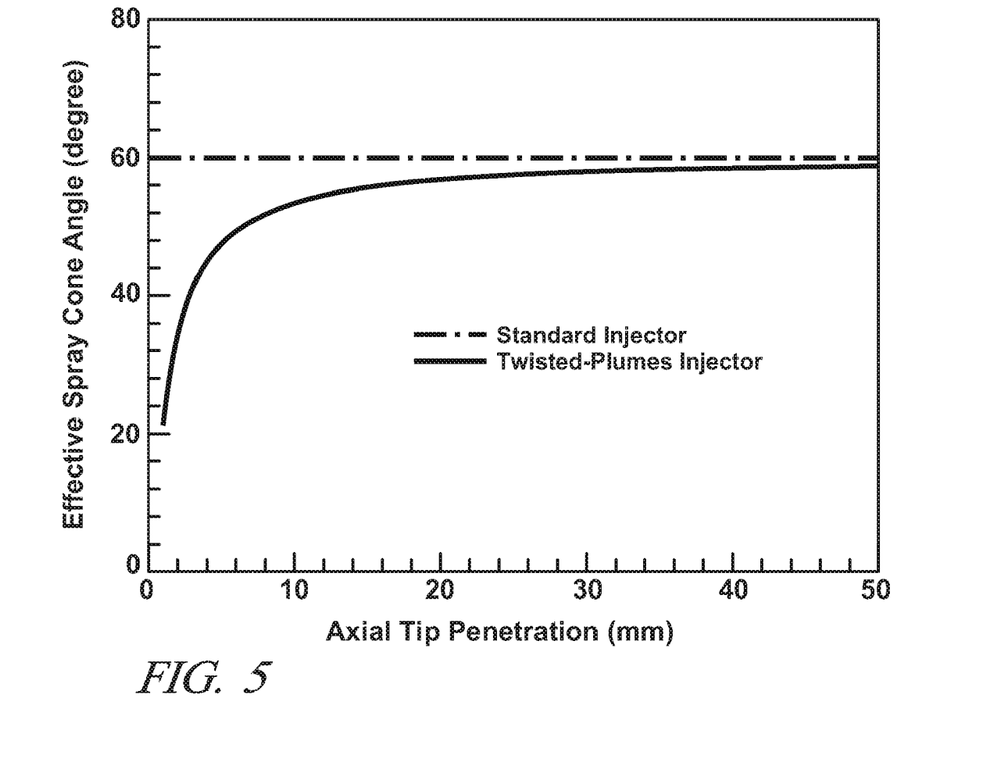
FIG. 5 is a graphical representation of effective spray cone angle versus axial tip penetration illustrating and comparing known fuel injectors and a twisted-plumes fuel injector in accordance with the present invention.

FIGS. 4A and 4B show CFD-predicted spray patterns comparing spray output from a standard injector (FIG. 4A) and the twisted-plumes injector (FIG. 4B) under typical conditions of middle-load stratified engine operation. More particularly, each figure shows fuel spray pattern progression relative to start of injection (SOI) at one crank angle (CA) degree increments at a mid-load stratified operating point of about 280 NMEP at 2000 RPM. Arrows 61 adjacent the fuel spray patterns correspond to fuel penetration into the combustion chamber which may be referred to herein as axial tip penetration. FIGS. 4A and 4B show spray particles as the central dots 62 in the plumes and the outer envelopes surfaces 64 of the plumes correspond to an equivalence ratio contour of substantially 0.5. One skilled in the art will appreciate that for the standard injector, the spray edge is close to a straight line, i.e. the spray cone angle remains substantially constant for all penetrations. In contrast, the effective spray cone gradually increases for the spray output from the twisted-plumes injector such that the spray cone edges expand outwardly with a bell-shaped curve. When it is assumed that the spray follows its initial exit velocity from the injector, the relation between the effective spray cone and the axial tip penetration can be mathematically derived. The differences in effective spray cone angles of the standard and the twisted-plumes injectors are illustrated in FIG. 5.

The differences in the effective spray cone angle which can be achieved has significant implications for mixture preparation in stratified SIDI engines which rely on fuel metering to control load in the absence of traditional air throttling. Based on requirements for engine load, stratified SIDI engines may operate in two distinct modes, to wit, homogenous-charge operation and stratified-charge operation, each having different requirements in terms of air/fuel mixture preparation. For the heavy load homogenous operation, maximizing engine power is the primary goal, therefore the spray needs to expand as much as possible in order to engage as much air as possible for fuel mixing. Thus, a larger spray cone angle is typically favored. In contrast, under the light load stratified operation, with less quantity of fuel injected, the mixture is globally lean. However, requirements for combustion stability and low emissions require the fuel to be burned close to stoichiometrically. Therefore, a compact mixture is required to achieve global stratification. To the extreme, very little fuel is injected at the idle condition, and the fuel cloud needs to be very compact. Considering the wide range of the required stratification at different part loads, a median spray cone angle is typically selected, which is optimum for median loads, but not necessarily optimum for heavy and light loads.

In accordance with the present invention, different operating requirements between the homogenous and stratified operations are readily managed. FIGS. 5A and 5B illustrate effective spray cone angle as a function of axial tip penetration for a standard injector and a twisted-plumes injector, respectively. For the twisted-plumes injector, the effective spray cone gradually increases with tip penetration. From the light load stratified operations to the heavy load homogenous operations, more fuel mass is injected with the increased load. With final spray penetration related to the injected mass, a higher penetration and thus a larger effective spray cone angle is effected at a higher load. As a direct benefit, the variations in the effective spray cone angle with the engine load (injected fuel mass) satisfy engine operating requirements discussed hereinabove. Through further optimization of the spray cone of the twisted-plumes injector, an overall better performance for both stratified and homogenous operations may be achieved compared to the standard injector. It is necessary that the fuel spray cone intersects to spark plug gap at the low load limit of the engine, measured for example by net mean effective pressure (NMEP) exhibiting a generally accepted no greater than about 5% coefficient of variation (COV) of indicated mean effective pressure (IMEP).

Figure 6:
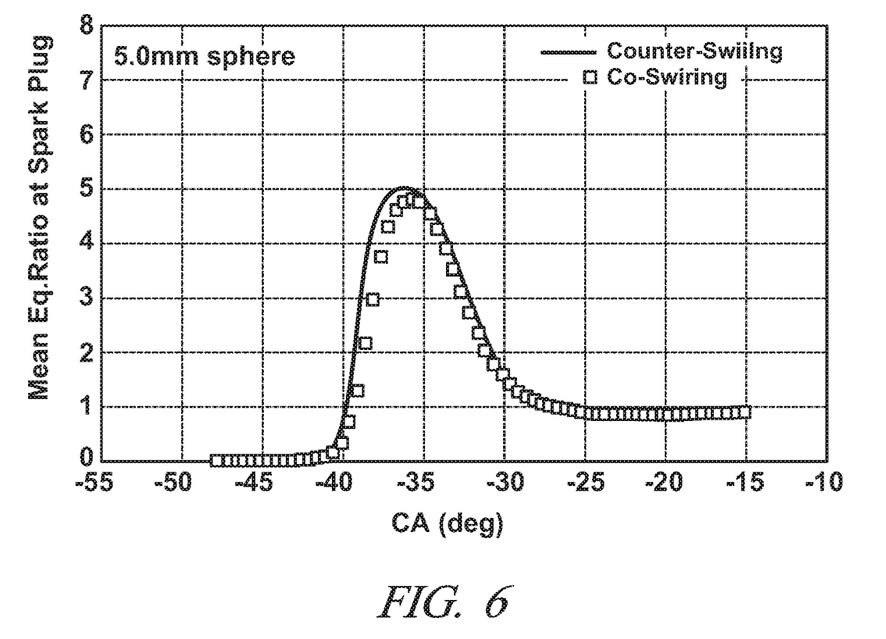
FIG. 6 is a graphical representation of mean equivalence ratio versus crank angle in an exemplary SIDI engine illustrating and comparing counter swirling and co-swirling intake air/twisted-plumes fuel injector arrangements in accordance with the present invention.
Figure 7:
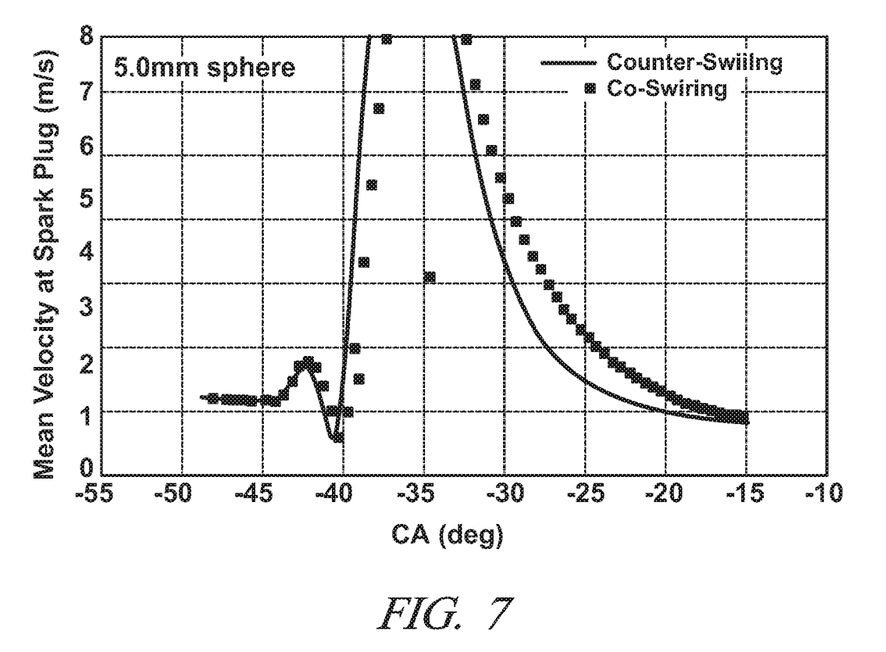
FIG. 7 is a graphical representation of mean velocity at the spark plug versus crank angle in an exemplary SIDI engine illustrating and comparing counter swirling and co-swirling intake air/twisted-plumes fuel injector arrangements in accordance with the present invention; and, FIG. 8 is a graphical representation of burn rate versus crank angle in an exemplary SIDI engine illustrating.
Figure 8:
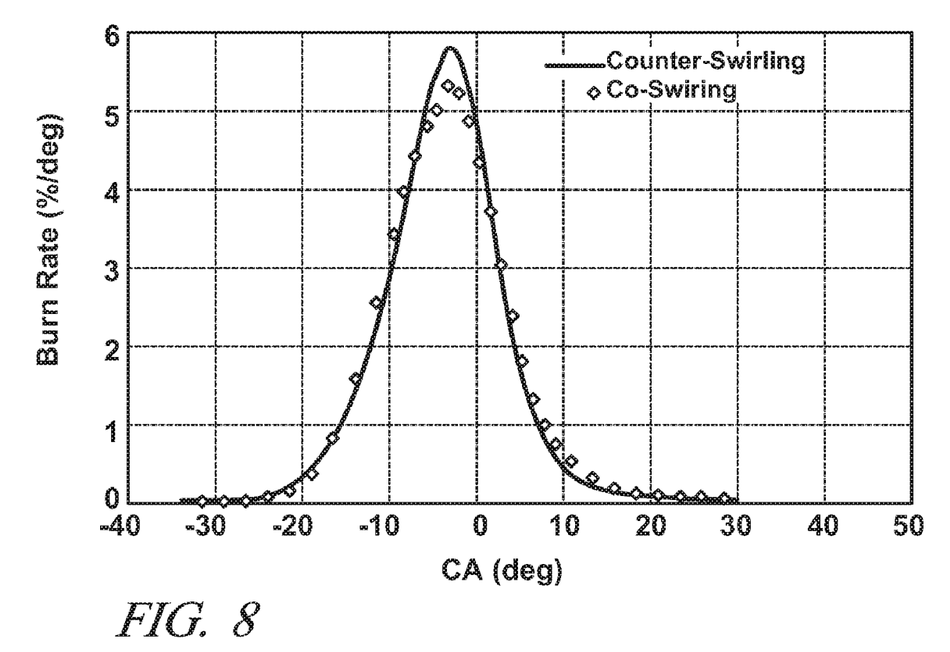

In accordance with another aspect of the invention, twisted-plumes fuel injection is cooperatively combined with the bulk intake air swirl in a manner to effect improved combustion stability. The inventors have through additional CFD modeling determined that providing fuel injected from the twisted-plumes injector results in improved ignition stability and increased peak burn rate when the fuel plumes are introduced with a tangential component that is in the opposite direction to the swirl of the bulk intake air. Such cooperative arrangement is referred to herein as counter-swirl and is preferred, whereas when the fuel plumes are introduced with a tangential component that is in the same direction to the swirl of the bulk intake air is referred to herein as co-swirl. Exemplary CFD results are shown in FIGS. 6 through 8. A counter swirl arrangement between the twisted-plumes injector and the bulk intake air reduces the spray-induced velocity thus increasing the ignitable mixture residence time around the spark plug gap. The CFD results shown in FIGS. 6 and 7 compare equivalence ratio and velocity, respectively, at the vicinity of the spark plug for the twisted-plumes injector with a counter bulk flow swirl direction for the intake air. One skilled in the art will appreciate that the velocity is reduced by about 5 m/sec on average, and the equivalence ratio is increased by about 0.2. Counter-swirling also leads to a higher peak burn rate as illustrated in FIG. 8 from which one skilled in the art will appreciate that about a 10% higher peak burn rate is achieved. One skilled in the art will also recognize that manipulation of the arrangements described including through-hole patterns, spray cone angle, swirl intensity, spark plug and injector locations, etc. will result in varying performance results.

The invention has been described with specific reference to the preferred embodiments and modifications thereto. Further modifications and alterations may occur to others upon reading and understanding the specification. It is intended to include all such modifications and alterations insofar as they come within the scope of the invention.

The invention claimed is:

1. Method for operating a spark-ignition, direct-injection internal combustion engine including a variable volume combustion chamber comprising a cylinder and reciprocating piston, a spark plug having a spark gap and a direct in-cylinder fuel injector for effecting a fuel spray pattern within the combustion chamber, comprising:
   providing a fuel injector tip having a plurality of through-holes arranged in a through-hole pattern to produce a fuel spray pattern having a relatively compact fuel cone angle at the low-load limit of the engine and a relatively wide fuel cone angle at the high-load limit of the engine; and,
   locating the fuel injector and spark gap such that a portion of the fuel spray pattern from the injector will intersect the spark gap at the low-load limit of the engine.

2. The method for operating a spark-ignition, direct-injection internal combustion engine as claimed in claim 1 wherein each of said through-holes is effective to direct a fuel plume along a respective through-hole axis that is neither parallel to nor coplanar with the injector centerline.

3. The method for operating a spark-ignition, direct-injection internal combustion engine as claimed in claim 1 wherein said through-hole pattern produces a fuel spray pattern of generally increasing fuel cone angle between the low load and the high load limits of the engine.

4. The method for operating a spark-ignition, direct-injection internal combustion engine as claimed in claim 1 wherein said through-hole pattern produces a fuel spray swirl generally opposing a bulk intake air swirl.

5. Method for operating a spark-ignition, direct-injection internal combustion engine including a variable volume combustion chamber comprising a cylinder and reciprocating piston, a spark plug having a spark gap and a direct in-cylinder fuel injector for effecting a fuel spray pattern within the combustion chamber, comprising:
   providing a fuel spray pattern from said fuel injector having a relatively compact fuel cone angle at the low-load limit of the engine, a relatively wide fuel cone angle at the high-load limit of the engine and a generally increasing fuel cone angle between the low load and the high load limits of the engine; and,
   locating the fuel injector and spark gap such that a portion of the fuel spray pattern from the injector will intersect the spark gap at the low-load limit of the engine.

6. The method for operating a spark-ignition, direct-injection internal combustion engine as claimed in claim 5 wherein providing a fuel spray pattern comprises providing a fuel injector tip having a plurality of through-holes wherein each through hole directs a fuel plume along a respective through-hole axis that is neither parallel to nor coplanar with the injector centerline.

7. The method for operating a spark-ignition, direct-injection internal combustion engine as claimed in claim 6 wherein each through hole directs a fuel plume to swirl in general opposition to a bulk intake air swirl.

8. Spark-ignition, direct-injection internal combustion engine apparatus, comprising:
   a variable volume combustion chamber including a cylinder, a cylinder head including an intake and an exhaust valve, and a reciprocating piston;
   a spark plug having a spark gap for producing an ignition spark within the combustion chamber;
   a fuel injector for injecting fuel within the combustion chamber;
   said fuel injector including a fuel injector tip having a plurality of through-holes arranged in a through-hole pattern to produce a fuel spray pattern with a fuel cone angle that generally increases with increasing fuel mass injection; and said fuel injector and spark plug being cooperatively located such that the fuel spray pattern intersects the spark gap.

9. The spark-ignition, direct-injection internal combustion engine apparatus as claimed in claim 8 wherein each of said through-holes directs a fuel plume along a respective through-hole axis that is neither parallel to nor coplanar with the injector centerline.

10. The spark-ignition, direct-injection internal combustion engine apparatus as claimed in claim 8 wherein each of said through-holes directs a fuel plume to swirl in general opposition to a bulk intake air swirl.

11. The spark-ignition, direct-injection internal combustion engine apparatus as claimed in claim 8 wherein the reciprocating piston includes a recessed bowl.

* * * * *